(12) United States Patent
Kawakami et al.

(10) Patent No.: US 8,980,126 B2
(45) Date of Patent: Mar. 17, 2015

(54) ELECTRODE MATERIAL AND METHOD FOR MANUFACTURING POWER STORAGE DEVICE

(75) Inventors: Takahiro Kawakami, Kanagawa (JP); Shunpei Yamazaki, Tokyo (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 313 days.

(21) Appl. No.: 13/251,373

(22) Filed: Oct. 3, 2011

(65) Prior Publication Data

US 2012/0085968 A1    Apr. 12, 2012

(30) Foreign Application Priority Data

Oct. 8, 2010  (JP) .................................. 2010-228849
Oct. 8, 2010  (JP) .................................. 2010-228857

(51) Int. Cl.

| H01M 4/88 | (2006.01) |
|---|---|
| H01M 4/58 | (2010.01) |
| C01B 25/37 | (2006.01) |
| C01B 25/45 | (2006.01) |
| H01M 4/38 | (2006.01) |
| H01M 4/36 | (2006.01) |

(52) U.S. Cl.
CPC ............. *H01M 4/5825* (2013.01); *C01B 25/37* (2013.01); *C01B 25/45* (2013.01); *H01M 4/38* (2013.01); *H01M 4/366* (2013.01)
USPC ....... 252/182.1; 252/506; 29/623.1; 423/306; 429/211; 429/221

(58) Field of Classification Search
USPC ............... 252/182.1, 506; 29/623.1; 423/306; 429/211, 221
See application file for complete search history.

(56) References Cited

U.S. PATENT DOCUMENTS

| 7,445,871 | B2 | 11/2008 | Suh et al. |
|---|---|---|---|
| 7,749,655 | B2 | 7/2010 | Doh et al. |
| 2003/0091900 | A1 | 5/2003 | Numata et al. |
| 2008/0222881 | A1* | 9/2008 | Yu et al. ....................... 29/623.1 |
| 2009/0081102 | A1* | 3/2009 | Dai et al. ....................... 423/306 |
| 2009/0252668 | A1* | 10/2009 | Cao et al. ....................... 423/306 |
| 2010/0065787 | A1* | 3/2010 | Armand et al. ............... 252/506 |
| 2010/0133467 | A1* | 6/2010 | Ikegawa ..................... 252/182.1 |
| 2011/0065004 | A1 | 3/2011 | Murakami et al. |
| 2011/0091772 | A1 | 4/2011 | Mishima et al. |
| 2012/0088157 | A1 | 4/2012 | Kawakami |

FOREIGN PATENT DOCUMENTS

JP        11-025983        1/1999

* cited by examiner

*Primary Examiner* — Khanh Tuan Nguyen
(74) *Attorney, Agent, or Firm* — Nixon Peabody LLP; Jeffrey L. Costellia (57) ABSTRACT

To provide a power storage device including an electrode material having a large capacity. First heat treatment is performed on a mixture of a compound containing lithium; a compound containing a metal element selected from manganese, iron, cobalt, and nickel; and a compound containing phosphorus. A cleaning step is performed on the mixture subjected to the first heat treatment. Second heat treatment is performed on the mixture subjected to the cleaning step, so that a lithium phosphate compound is produced. With the use of the lithium phosphate compound, an electrode is formed.

21 Claims, 6 Drawing Sheets

ELECTRODE MATERIAL AND METHOD FOR MANUFACTURING POWER STORAGE DEVICE

BACKGROUND OF THE INVENTION

1. Field of the Invention

The present invention relates to an electrode material, a power storage device including the electrode material, and manufacturing methods thereof.

2. Description of the Related Art

There has been significant advance in the field of portable electronic devices such as personal computers and mobile phones. The portable electronic devices need chargeable power storage devices having high energy density, which are small, lightweight, and reliable. As such a power storage device, for example, a lithium-ion secondary battery is known. In addition, development of electrically propelled vehicles on which lithium-ion secondary batteries are mounted has also progressed rapidly owing to growing awareness of environmental problems and energy problems.

As a positive electrode active material in a lithium-ion secondary battery, a lithium phosphate compound having an olivine structure and including lithium (Li), and iron (Fe) or manganese (Mn), such as lithium iron phosphate ($LiFePO_4$) or lithium manganese phosphate ($LiMnPO_4$), and the like have been known (see Patent Document 1).

REFERENCE

[Patent Document 1] Japanese Published Patent Application No. H11-25983

SUMMARY OF THE INVENTION

In a lithium phosphate compound, intercalation and deintercalation of lithium ions can be performed and change in a crystal structure is not easily induced by intercalation and deintercalation of lithium ions; therefore, such a lithium phosphate compound is expected as a promising positive electrode active material of a power storage device.

However, in a power storage device in which a lithium phosphate compound is used as a positive electrode active material, only a capacity smaller than the theoretical capacity obtained from the crystal structure of the lithium phosphate compound by calculation can be obtained.

In view of the above problem, an object of one embodiment of the disclosed invention is to provide an electrode material having a large capacity. Another object is to provide a power storage device including an electrode material having a large capacity.

In a lithium-ion secondary battery, at the time of charging, lithium included in a positive electrode active material is ionized into lithium ions and the lithium ions move to a negative electrode through an electrolyte. As the number of carrier ions (here, lithium ions) which can leave and enter is increased in a positive electrode active material layer whose volume is unchanged, the capacity of a battery can be increased.

A lithium phosphate compound used as a positive electrode active material, such as lithium iron phosphate or lithium manganese phosphate, has an olivine structure, and in such a lithium phosphate compound, lithium atoms are arranged in a unidimensional manner. Thus, the diffusion path of lithium ions that are carrier ions is also unidimensional, that is, a one-way path. Here, when the crystal structure of a lithium phosphate compound has crystal distortion, the diffusion path is likely to have a harmful effect, which leads to reduction in the number of lithium ions intercalated and deintercalated. Accordingly, improvement in crystallinity of lithium iron phosphate allows an increase in the number of lithium ions intercalated and deintercalated, resulting in an increase in capacity of a power storage device.

According to one embodiment of the present invention, in a manufacturing process of a power storage device, a cleaning step is employed to increase the capacity of an electrode material and a power storage device including the electrode material.

One embodiment of the present invention is a method for manufacturing a power storage device, which includes the following steps: performing first heat treatment on a mixture of a compound including lithium, a compound including a metal element selected from manganese, iron, cobalt, and nickel, and a compound including phosphorus; performing a cleaning step on the mixture subjected to the first heat treatment; performing second heat treatment on the mixture subjected to the cleaning step, so that a lithium phosphate compound is produced; and forming an electrode including the lithium phosphate compound.

One embodiment of the present invention is a method for manufacturing a power storage device, which includes the following steps: performing first heat treatment on a mixture of a compound including lithium, a compound including a metal element selected from manganese, iron, cobalt, and nickel, and a compound including phosphorus; performing a cleaning step on the mixture subjected to the first heat treatment; adding an organic compound to the mixture subjected to the cleaning step; performing second heat treatment on the mixture to which the organic compound is added, so that a lithium phosphate compound is produced; and forming an electrode including the lithium phosphate compound.

In the above structure, a neutral or alkaline cleaning solution can be used as a cleaning solution used in the cleaning step.

The present inventors have found that a power storage device having a large capacity can be obtained when lithium iron phosphate in which the total amount of sulfur, manganese, nickel, cobalt, boron, chromium, molybdenum, and zinc is 10 ppm or less with respect to the weight of the lithium iron phosphate is used as a positive electrode active material.

That is to say, one embodiment of the present invention is an electrode material including lithium iron phosphate in which the total amount of sulfur, manganese, nickel, cobalt, boron, chromium, molybdenum, and zinc is 10 ppm or less with respect to the weight of the lithium iron phosphate.

One embodiment of the present invention is an electrode material including lithium iron phosphate in which the concentration of sulfur is 5.1 ppm or less, the concentration of manganese is 0.55 ppm or less, the concentration of nickel is 0.1 ppm or less, the concentration of cobalt is 0.1 ppm or less, the concentration of boron is 1.7 ppm or less, the concentration of chromium is 0.38 ppm or less, the concentration of molybdenum is 0.1 ppm or less, and the concentration of zinc is 0.59 ppm or less.

The lithium iron phosphate is an electrode material coated with carbon.

One embodiment of the present invention is a storage device including the electrode material as a positive electrode active material.

According to one embodiment of the disclosed invention, an electrode material having a large capacity or a power storage device having a large capacity can be obtained.

DETAILED DESCRIPTION OF THE INVENTION

Embodiments and examples of the present invention will be described below with reference to the drawings. Note that the present invention is not limited to the following description. It will be readily appreciated by those skilled in the art that various changes and modifications are possible without departing from the spirit and the scope of the present invention. Therefore, the present invention should not be construed as being limited to the following description of the embodiments and the examples. Note that in describing the structure of the present invention with reference to the drawing, reference numerals denoting the same portions are used in different drawings in common.

Note that the size, the thickness of a layer, and a region of each structure illustrated in the drawings and the like in the embodiments and the examples are exaggerated for simplicity in some cases. Therefore, embodiments and examples of the present invention are not limited to such scales.

Note that terms with ordinal numbers such as "first", "second", and "third" in this specification are used in order to identify components, for convenience, and the terms do not limit the number of the components, the order of steps, or the like.

Embodiment 1

In this embodiment, an example of a method for manufacturing an electrode material will be described. Here, a lithium phosphate compound represented by a general formula $LiMePO_4$ is used for an electrode material. More specifically, an example of a method for manufacturing an electrode material including lithium iron phosphate in which iron (Fe) is used as Me or lithium manganese phosphate in which manganese (Mn) is used as Me will be described. Although a method for manufacturing an electrode material by a solid phase method will be described below, this embodiment is not limited thereto. An electrode material may be manufactured using a liquid phase method.

First, the following compounds in the general formula $LiMePO_4$ (note that Me represents manganese (Mn) or iron (Fe)) are mixed at a predetermined composition ratio to form a mixed material: a compound including lithium, which is a supply source of Li; a compound including phosphorus, which is a supply source of P; and a compound including iron or manganese, which is a supply source of Me.

As the compound including lithium, for example, lithium salt such as lithium carbonate ($Li_2CO_3$), lithium oxide ($Li_2O$), lithium sulfide ($Li_2S$), lithium peroxide ($Li_2O_2$), lithium sulfate ($Li_2SO_4$), lithium sulfite ($Li_2SO_3$), lithium thiosulfate ($Li_2S_2O_3$), lithium chromate ($Li_2CrO_4$), or lithium dichromate ($Li_2Cr_2O_7$) can be used.

As the compound including manganese, for example, manganese oxide, manganese (II) oxalate dihydrate, or manganese (II) carbonate can be used. When such a compound including manganese is used for a mixed material, an electrode material including lithium manganese phosphate can be manufactured. As the compound including iron, for example, iron oxide, iron (II) oxalate dihydrate, or iron (II) carbonate can be used. When such a compound including iron is used for a mixed material, an electrode material including lithium iron phosphate can be manufactured.

Note that cobalt (Co) or Nickel (Ni) may be used as Me in the lithium phosphate compound represented by the general formula $LiMePO_4$. As a compound including cobalt or nickel, an oxide of cobalt or nickel (cobalt oxide or nickel oxide), an oxalate (cobalt oxalate or nickel oxalate), a carbonate (cobalt carbonate or nickel carbonate), or the like can be used.

As the compound including phosphorus, for example, a phosphate such as ammonium dihydrogen phosphate ($NH_4H_2PO_4$) or diphosphorus pentoxide ($P_2O_5$) can be used.

As a method for mixing the above compounds, for example, ball mill treatment can be used. Specifically, in the method, for example, a highly volatile solvent such as acetone is added to the compounds each of which is weighed, and the treatment is performed using a metal or ceramic ball (with a ball radius of $\phi 1$ mm or more and 10 mm or less) with a revolution number of 50 rpm or more and 500 rpm or less for a revolution time of 30 minutes or more and 5 hours or less. With ball mill treatment, the compounds can be mixed and formed into minute particles, so that the electrode material that is to be manufactured can be minute particles. In addition, with ball mill treatment, the compounds which are raw materials can be uniformly mixed, leading to improvement in crystallinity of the electrode material that is to be manufactured. Note that other than acetone, a solvent in which the raw materials are not dissolved, such as ethanol or methanol, may be used.

Then, after heating the mixed material and evaporating the solvent, pressure is applied to the mixed material with a pellet press to shape pellets. The pellets are subjected to first heat treatment (pre-baking). The first heat treatment may be performed at a temperature of greater than or equal to 300° C. and less than or equal to 400° C. for longer than or equal to 1 hour and shorter than or equal to 20 hours, preferably shorter than or equal to 10 hours. When the temperature of the first heat treatment (pre-baking) is too high, the particle size of a positive electrode active material becomes too large and thus a property of a battery is degraded in some cases. However, when the first heat treatment (pre-baking) is performed at a low temperature of greater than or equal to 300° C. and less than or equal to 400° C., a crystal nucleus can be formed with crystal growth suppressed. Therefore, the electrode material can be formed into minute particles.

The first heat treatment is preferably performed in a hydrogen atmosphere, or an inert gas atmosphere of a rare gas (such as helium, neon, argon, or xenon) or nitrogen.

After the first heat treatment, a cleaning step is performed on the baked product. As a cleaning solution, a neutral or alkaline cleaning solution such as pure water or an alkalescent solution (e.g., a sodium hydroxide solution with a pH of approximately 9.0) can be used. For example, after cleaning at room temperature for an hour, the solution may be filtrated to collect the baked product.

By cleaning the baked product, impurities included therein can be reduced, so that a highly purified lithium phosphate compound can be formed. The highly purified lithium phosphate compound in which the impurity concentration is reduced has improved crystallinity, which makes it possible to increase the number of carrier ions which are intercalated and deintercalated in charging and discharging.

After the first heat treatment is completed or after the first heat treatment and the cleaning step following the first heat treatment are completed, an organic compound such as glucose may be added. When subsequent steps are performed after glucose is added, surfaces of crystal particles of the lithium phosphate compound are coated with carbon supplied from the glucose. In this specification, "crystal particles of a lithium phosphate compound, which have surfaces coated with a carbon material" also means that crystal particles of a lithium phosphate compound are carbon-coated.

When the surfaces of the crystal particles of the lithium phosphate compound are coated with carbon, the conductivity of the surfaces of the crystal particles of the lithium phosphate compound can be increased. In addition, when the crystal particles of the lithium phosphate compound are in contact with each other through carbon coating the surfaces, the crystal particles of the lithium phosphate compound become electrically conductive with each other; thus, the conductivity of an active material layer can be increased. The thickness of the carbon used for coating (a carbon layer) is preferably greater than 0 nm and less than or equal to 100 nm, more preferably greater than or equal to 5 nm and less than or equal to 10 nm.

Glucose is suitable for a supply source of carbon because it readily reacts with a phosphate group. Alternatively, cyclic monosaccharide, straight-chain monosaccharide, or polysaccharide which reacts well with a phosphate group may be used instead of glucose.

Next, the cleaned material is ground in a mortar or the like, and mixing is performed with ball mill treatment in a manner similar to that of the above. Then, after heating the mixed material obtained by performing mixing and evaporating a solvent, pressure is applied to the mixed material with a pellet press to shape pellets. The pellets are subjected to second heat treatment (main-baking).

The second heat treatment may be performed at a temperature of greater than or equal to 500° C. and less than or equal to 800° C. (preferably about 600° C.) for longer than or equal to 1 hour and shorter than or equal to 20 hours (preferably shorter than or equal to 10 hours). The temperature of the second heat treatment is preferably higher than the temperature of the first heat treatment.

Through the above process, the lithium phosphate compound that can be used as the electrode material can be manufactured.

The above electrode material according to this embodiment manufactured through a cleaning step enables improvement in capacity of a power storage device including the electrode material.

The methods, structures, and the like described in this embodiment can be combined as appropriate with any of the methods, structures, and the like described in the other embodiments and examples.

Embodiment 2

In this embodiment, another example of a method for manufacturing an electrode material will be described. More specifically, an example of a method for manufacturing an electrode material including lithium iron phosphate represented by a general formula $LiFePO_4$ will be described. Although a method for manufacturing an electrode material by a solid phase method will be described below, this embodiment is not limited thereto. An electrode material may be manufactured using a liquid phase method.

The electrode material according to one embodiment of the present invention includes lithium iron phosphate which facilitates diffusion of carrier ions because its crystallinity is improved. As a factor of crystal distortion, a deficiency in a constituent element and element substitution with another element due to an impurity or the like can be given. In this embodiment, a compound in which impurities are reduced is used as a compound which is a raw material of lithium iron phosphate, whereby a highly purified lithium iron phosphate having improved crystallinity is manufactured. Note that a lattice constant is given as one of indices of crystallinity. The lattice constant of the crystal structure of an inorganic compound is disclosed in the inorganic crystal structure database (ICSD).

Description will be given taking specific raw materials below.

First, the following compounds for $LiFePO_4$ are mixed at a predetermined composition ratio to form a mixed material: a compound including lithium, which is a supply source of Li, a compound including phosphorus, which is a supply source of P, and a compound including iron, which is a supply source of Fe.

As the compound including lithium, for example, lithium salt such as lithium carbonate ($Li_2CO_3$), lithium oxide ($Li_2O$), or lithium peroxide ($Li_2O_2$) can be used.

The concentrations of impurity elements of a compound including lithium are preferably the following values. For example, in the case of lithium carbonate ($Li_2CO_3$), it is preferable that the concentration of sulfur be 1 ppm or less, the concentration of manganese be 0.02 ppm or less, the concentration of nickel be 0.05 ppm or less, the concentration of cobalt be 0.005 ppm or less, the concentration of boron be 0.01 ppm or less, the concentration of chromium be 0.51 ppm or less, the concentration of molybdenum be 0.05 ppm or less, and the concentration of zinc be 0.17 ppm or less.

Note that the concentrations of these elements can be measured by glow discharge mass spectrometry (GDMS) or the like.

As the compound including iron, for example, iron oxide, iron (II) oxalate dihydrate, or iron (II) carbonate can be used.

The concentrations of impurity elements of a compound including iron are preferably the following values. For example, in the case of iron (II) oxalate dihydrate ($FeC_2O_4.2H_2O$), it is preferable that the concentration of sulfur be 1.6 ppm or less, the concentration of manganese be 0.1 ppm or less, the concentration of nickel be 0.1 ppm or less, the concentration of cobalt be 0.1 ppm or less, the concentration of boron be 0.25 ppm or less, the concentration of chromium be 0.1 ppm or less, the concentration of molybdenum be 0.8 ppm or less, and the concentration of zinc be 0.1 ppm or less. The lower the impurity element concentrations are, the better.

As the compound including phosphorus, for example, a phosphate such as ammonium dihydrogen phosphate ($NH_4H_2PO_4$) or diphosphorus pentoxide ($P_2O_5$) can be used.

The concentrations of impurity elements of a compound including phosphorus are preferably the following values. For example, in the case of ammonium dihydrogen phosphate ($NH_4H_2PO_4$), it is preferable that the concentration of sulfur be 5 ppm or less, the concentration of manganese be 0.1 ppm or less, the concentration of nickel be 0.1 ppm or less, the concentration of cobalt be 0.05 ppm or less, the concentration of boron be 1.3 ppm or less, the concentration of chromium be 0.5 ppm or less, the concentration of molybdenum be 0.1 ppm or less, and the concentration of zinc be 0.5 ppm or less. The lower the impurity element concentrations are, the better.

As a method for mixing the above compounds, for example, ball mill treatment can be used. Specifically, in the method, for example, a highly volatile solvent such as acetone is added to the compounds each of which is weighed, and the treatment is performed using a metal or ceramic ball (with a ball radius of φ1 mm or more and 10 mm or less) with a revolution number of 50 rpm or more and 500 rpm or less for a revolution time of 30 minutes or more and 5 hours or less. With ball mill treatment, the compounds can be mixed and formed into minute particles, so that the electrode material that is to be manufactured can be minute particles. In addition, with ball mill treatment, the compounds which are raw materials can be uniformly mixed, leading to improvement in crystallinity of the electrode material that is to be manufactured. Note that other than acetone, a solvent in which the raw materials are not dissolved, such as ethanol or methanol, may be used.

Then, after heating the mixed material and evaporating the solvent, pressure is applied to the mixed material with a pellet press to shape pellets. The pellets are subjected to first heat treatment (pre-baking). The first heat treatment may be performed at a temperature of greater than or equal to 300° C. and less than or equal to 400° C. for longer than or equal to 1 hour and shorter than or equal to 20 hours, preferably shorter than or equal to 10 hours. When the temperature of the pre-baking is too high, the particle size of a positive electrode active material becomes too large and thus a property of a battery is degraded in some cases. However, when the first heat treatment (pre-baking) is performed at a low temperature of greater than or equal to 300° C. and less than or equal to 400° C., a crystal nucleus can be formed with crystal growth suppressed. Therefore, the electrode material can be formed into minute particles.

The first heat treatment is preferably performed in a hydrogen atmosphere, or an inert gas atmosphere of a rare gas (such as helium, neon, argon, or xenon), nitrogen, or the like.

Then, the mixed material subjected to the first heat treatment is ground in a mortar or the like. After grinding, the baked product may be cleaned in pure water or an alkalescent solution (e.g., a sodium hydroxide solution with a pH of approximately 9.0). By cleaning the baked product, impurities included therein can be further reduced, which leads to further improvement in crystallinity of lithium iron phosphate to be manufactured. For example, after cleaning at room temperature for an hour, the solution may be filtrated to collect the baked product.

After the first heat treatment and grinding are completed or after the cleaning step following the first heat treatment and grinding is completed, an organic compound such as glucose may be added. When subsequent steps are performed after glucose is added, surfaces of crystal particles of the lithium iron phosphate are coated with carbon supplied from the glucose. In this specification, "crystal particles of lithium iron phosphate, which have surfaces coated with a carbon material" also means that crystal particles of lithium iron phosphate are carbon-coated.

When the surfaces of the crystal particles of the lithium iron phosphate are coated with carbon, the conductivity of the surfaces of the crystal particles of the lithium iron phosphate can be increased. In addition, when the crystal particles of the lithium iron phosphate are in contact with each other through carbon coating the surfaces, the crystal particles of the lithium iron phosphate become electrically conductive with each other; thus, the conductivity of the positive electrode active material can be increased. The thickness of the carbon used for coating (a carbon layer) is preferably greater than 0 nm and less than or equal to 100 nm, more preferably greater than or equal to 5 nm and less than or equal to 10 nm.

Glucose is suitable for a supply source of carbon because it readily reacts with a phosphate group. Alternatively, cyclic monosaccharide, straight-chain monosaccharide, or polysaccharide which reacts well with a phosphate group may be used instead of glucose.

Next, mixing is performed with ball mill treatment in a manner similar to that of the above. Then, after heating the mixed material obtained by performing mixing and evaporating a solvent, pressure is applied to the mixed material with a pellet press to shape pellets. The pellets are subjected to second heat treatment (main-baking).

The second heat treatment may be performed at a temperature of greater than or equal to 500° C. and less than or equal to 800° C. (preferably about 600° C.) for longer than or equal to 1 hour and shorter than or equal to 20 hours (preferably shorter than or equal to 10 hours). The temperature of the second heat treatment is preferably higher than the temperature of the first heat treatment.

Through the above process, the lithium iron phosphate that can be used as the electrode material can be manufactured.

The impurity element concentration of the lithium iron phosphate used as the electrode material is 122 ppm or less, preferably 70 ppm or less, more preferably 10 ppm or less. When impurity elements of the lithium iron phosphate are, for example, sulfur, manganese, nickel, cobalt, boron, chromium, molybdenum, and zinc, it is preferable that the total content thereof be 70 ppm or less, preferably 10 ppm or less with respect to the weight of the lithium iron phosphate. Specifically, it is preferable that the concentration of sulfur be 5.1 ppm or less, the concentration of manganese be 0.55 ppm or less, the concentration of nickel be 0.1 ppm or less, the concentration of cobalt be 0.1 ppm or less, the concentration of boron be 1.7 ppm or less, the concentration of chromium be 0.38 ppm or less, the concentration of molybdenum be 0.1 ppm or less, and the concentration of zinc be 0.59 ppm or less. The lower the impurity element concentrations are, the better.

Further, by reducing impurity elements included in the lithium iron phosphate, crystallinity thereof can be improved. It is preferable that the lattice constant in the a-axis direction of the lithium iron phosphate having improved crystallinity be greater than or equal to $10.3254 \times 10^{-10}$ m and less than or equal to $10.3258 \times 10^{-10}$ m, the lattice constant in the b-axis direction be greater than or equal to $6.0035 \times 10^{-10}$ m and less than or equal to $6.0052 \times 10^{-10}$ m, and the lattice constant in the c-axis direction be greater than or equal to $4.6879 \times 10^{-10}$ m and less than or equal to $4.6902 \times 10^{-10}$ m.

The electrode material according to this embodiment manufactured as described above is highly purified to improve crystallinity, which makes it possible to increase the number of carrier ions which are intercalated and deintercalated in charging and discharging. Thus, when the electrode material is used for a power storage device, the capacity of the power storage device can be improved.

The methods, structures, and the like described in this embodiment can be combined as appropriate with any of the methods, structures, and the like described in the other embodiments.

Embodiment 3

In this embodiment, a lithium-ion secondary battery will be described in which an electrode material obtained through the manufacturing process described in Embodiment 1 or Embodiment 2 is used as a positive electrode active material. The schematic structure of the lithium-ion secondary battery is illustrated in FIG. 1.

Figure 1:
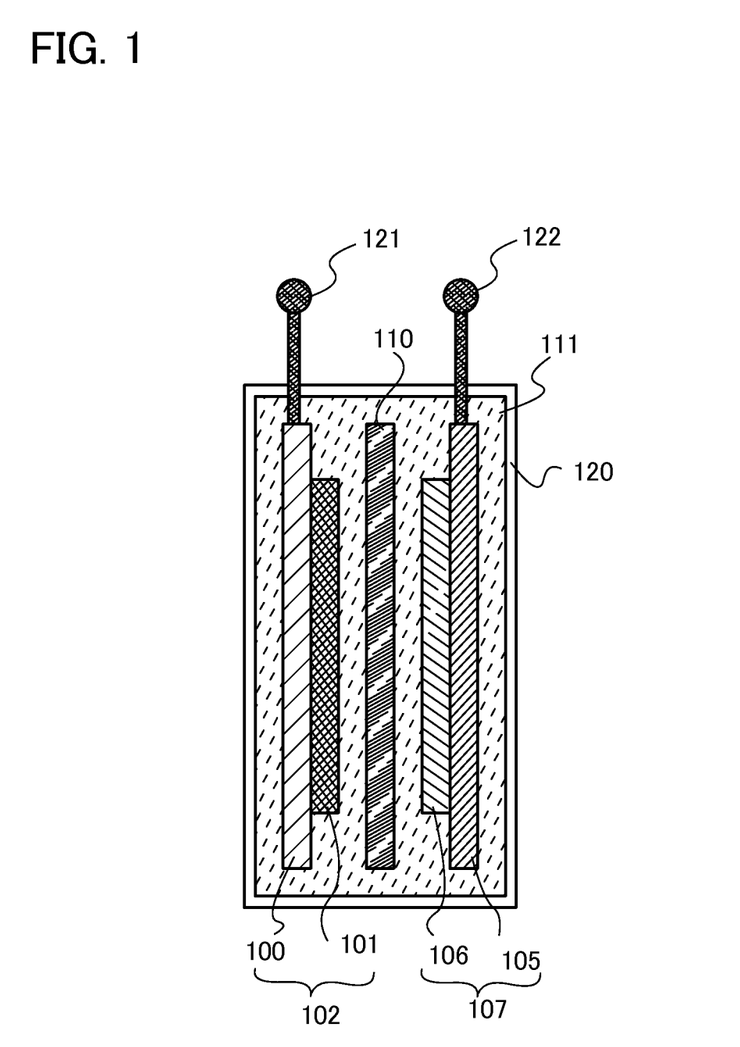
FIG. 1 illustrates one embodiment of a power storage device.

In the lithium-ion secondary battery illustrated in FIG. 1, a positive electrode 102, a negative electrode 107, and a separator 110 are provided in a housing 120 which is isolated from the outside, and an electrolyte 111 is filled in the housing 120. The positive electrode active material layer 101 is formed over the positive electrode collector 100. The positive electrode active material layer 101 includes the electrode material manufactured in Embodiment 1. On the other hand, a negative electrode active material layer 106 is formed over a negative electrode collector 105. In this specification, the positive electrode active material layer 101 and the positive electrode collector 100 over which the positive electrode active material layer 101 is formed are collectively referred to as the positive electrode 102. The negative electrode active material layer 106 and the negative electrode collector 105 over which the negative electrode active material layer 106 is formed are collectively referred to as the negative electrode 107.

In addition, the separator 110 is provided between the positive electrode 102 and the negative electrode 107. A first electrode 121 and a second electrode 122 are connected to the positive electrode collector 100 and the negative electrode collector 105, respectively, and charging and discharging are performed with the first electrode 121 and the second electrode 122. Moreover, there are certain gaps between the positive electrode active material layer 101 and the separator 110 and between the negative electrode active material layer 106 and the separator 110; however, one embodiment of the present invention is not limited thereto. The positive electrode active material layer 101 may be in contact with the separator 110, and the negative electrode active material layer 106 may be in contact with the separator 110. In addition, the lithium-ion secondary battery may be rolled into a cylinder shape with the separator 110 provided between the positive electrode 102 and the negative electrode 107.

Note that an "active material" refers to a material that relates to intercalation and deintercalation of ions serving as carriers, that is, a lithium phosphate compound or a lithium phosphate compound coated with carbon. Note also that a "positive electrode active material layer" in this specification refers to a thin film including an active material, a binder, and a conduction auxiliary agent.

As the positive electrode collector 100, a material having high conductivity such as aluminum or stainless steel can be used. The positive electrode collector 100 can have a foil shape, a plate shape, a net shape, or the like as appropriate.

As the positive electrode active material, the lithium phosphate compound described in Embodiment 1 is used.

The lithium phosphate compound obtained through the second heat treatment (main baking) is ground again in a ball-mill machine to be formed into fine powder. A conduction auxiliary agent, a binder, and a solvent are mixed into the obtained fine powder to obtain paste.

As the conduction auxiliary agent, a material which is itself an electron conductor and does not cause chemical reaction with other materials in a battery device may be used. For example, carbon-based materials such as graphite, carbon fiber, carbon black, acetylene black, and VGCF (registered trademark); metal materials such as copper, nickel, aluminum, and silver; and powder, fiber, and the like of mixtures thereof can be given. The conduction auxiliary agent is a material that assists conductivity between active materials; it is filled between active materials which are apart from each other and makes conduction between the active materials.

As the binder, polysaccharides such as starch, carboxymethyl cellulose, hydroxypropyl cellulose, regenerated cellulose, and diacetyl cellulose; vinyl polymers such as polyvinyl chloride, polyethylene, polypropylene, polyvinyl alcohol, polyvinyl pyrrolidone, polytetrafluoroethylene, polyvinylide fluoride, ethylene-propylene-diene monomer (EPDM) rubber, sulfonated EPDM rubber, styrene-butadiene rubber, butadiene rubber, and fluorine rubber; polyether such as polyethylene oxide; and the like can be given.

The lithium phosphate compound used as the electrode material, the conduction auxiliary agent, and the binder are mixed at 80 wt % to 96 wt %, 2 wt % to 10 wt %, and 2 wt % to 10 wt %, respectively, where the total proportion is 100 wt %. Further, an organic solvent, the volume of which is substantially the same as that of a mixture of the electrode material, the conduction auxiliary agent, and the binder, is mixed into the mixture, and this mixture is processed into a slurry state. Note that an object which is obtained by processing, into a slurry state, the mixture of the electrode material, the conduction auxiliary agent, the binder, and the organic solvent is referred to as slurry. As the solvent, N-methyl-2-pyrrolidone, lactic acid ester, or the like can be used. The proportions of the active material, the conduction auxiliary agent, and the binder are preferably adjusted as appropriate in such a manner that, for example, when the active material and the conduction auxiliary agent have low adhesiveness at the time of film formation, the amount of binder is increased, and when the resistance of the active material is high, the amount of conduction auxiliary agent is increased.

Here, aluminum foil is used as the positive electrode collector 100. The slurry is dripped thereon and is thinly spread by a casting method. Then, after the slurry is further rolled out by a roller press machine so that the thickness is made uniform, vacuum drying (under a pressure of less than or equal to 10 Pa) or heat drying (at a temperature of 150° C. to 280° C.) is performed. Thus, the positive electrode active material layer 101 is formed over the positive electrode collector 100. The desired thickness of the positive electrode active material layer 101 is set in the range of 20 μm to 150 μm. It is preferable to adjust the thickness of the positive electrode active material layer 101 as appropriate so that cracks and separation do not occur. Further, it is preferable that generation of cracks and separation on the positive electrode active material layer 101 be prevented not only when a lithium-ion secondary battery is flat but also when it is rolled into a cylinder shape, though it depends on a form of a lithium-ion secondary battery.

As the negative electrode collector 105, a material having high conductivity such as copper, stainless steel, iron, or nickel can be used.

As the negative electrode active material layer 106, lithium, aluminum, graphite, silicon, germanium, or the like is used. The negative electrode active material layer 106 may be formed over the negative electrode collector 105 by a coating method, a sputtering method, an evaporation method, or the like. Alternatively, each material may be used alone as the negative electrode active material layer 106. The theoretical lithium occlusion capacity is larger in germanium, silicon, lithium, and aluminum than in graphite. When the occlusion capacity is large, charge and discharge can be performed sufficiently even in a small area; therefore, cost reduction and miniaturization of a secondary battery can be realized. However, in the case of silicon or the like, the volume is increased to approximately four times as large as the volume at the time before lithium occlusion; therefore, it is necessary to pay attention to the risk of explosion, the probability that the material itself gets vulnerable, and the like.

As the electrolyte, an electrolyte that is an electrolyte in a liquid state, a solid electrolyte that is an electrolyte in a solid state may be used. The electrolyte includes an alkali metal ion or an alkaline earth metal ion as a carrier ion, and this carrier ion is responsible for electric conduction. Examples of the alkali metal ion include a lithium ion, a sodium ion, and potassium ion. Examples of the alkaline earth metal ion include a calcium ion, a strontium ion, and a barium ion. Besides, a beryllium ion and a magnesium ion are given as carrier ions.

The electrolyte 111 includes, for example, a solvent and a lithium salt or a sodium salt dissolved in the solvent. Examples of the lithium salt include lithium chloride (LiCl), lithium fluoride (LiF), lithium perchlorate ($LiClO_4$), lithium tetrafluoroborate ($LiBF_4$), $LiAsF_6$, $LiPF_6$, and $Li(C_2F_5SO_2)_2N$. Examples of the sodium salt include sodium chloride (NaCl), sodium fluoride (NaF), sodium perchlorate ($NaClO_4$), and sodium fluoroborate ($NaBF_4$).

Examples of the solvent for the electrolyte 111 include cyclic carbonates (e.g., ethylene carbonate (hereinafter abbreviated to EC), propylene carbonate (PC), butylene carbonate (BC), and vinylene carbonate (VC)); acyclic carbonates (e.g., dimethyl carbonate (DMC), diethyl carbonate (DEC), ethylmethyl carbonate (EMC), methylpropyl carbonate (MPC), isobutyl methyl carbonate, and dipropyl carbonate (DPC)); aliphatic carboxylic acid esters (e.g., methyl formate, methyl acetate, methyl propionate, and ethyl propionate); acyclic ethers (e.g., 1,2-dimethoxyethane (DME), 1,2-diethoxyethane (DEE), ethoxymethoxy ethane (EME), and γ-lactones such as γ-butyrolactone); cyclic ethers (e.g., tetrahydrofuran and 2-methyltetrahydrofuran); cyclic sulfones (e.g., sulfolane); alkyl phosphate esters (e.g., dimethylsulfoxide and 1,3-dioxolane, and trimethyl phosphate, triethyl phosphate, and trioctyl phosphate); and fluorides thereof. One of the above solvents or a combination of two or more of the above solvents can be used for the electrolyte 111.

As the separator 110, paper; nonwoven fabric; glass fiber; synthetic fiber such as nylon (polyamide), vinylon (also called vinalon) (polyvinyl alcohol based fiber), polyester, acrylic, polyolefin, or polyurethane; or the like may be used. However, it is necessary to select a material which does not dissolve in the electrolyte 111 described above.

More specifically, examples of the material for the separator 110 include fluorine-based polymers, polyethers such as a polyethylene oxide and a polypropylene oxide, polyolefins such as polyethylene and polypropylene, polyacrylonitrile, polyvinylidene chloride, polymethyl methacrylate, polymethylacrylate, polyvinyl alcohol, polymethacrylonitrile, polyvinyl acetate, polyvinylpyrrolidone, polyethyleneimine, polybutadiene, polystyrene, polyisoprene, and polyurethane based polymers, and derivatives thereof, cellulose, paper, and nonwoven fabric. One of the above materials or a combination of two or more of the above materials can be used for the separator 110.

When charging the lithium-ion secondary battery described above, a positive electrode terminal is connected to the first electrode 121 and a negative electrode terminal is connected to the second electrode 122. An electron is taken away from the positive electrode 102 through the first electrode 121 and transferred to the negative electrode 107 through the second electrode 122. In addition, a lithium ion is eluted from the active material in the positive electrode active material layer 101 from the positive electrode, reaches the negative electrode 107 through the separator 110, and is taken in the active material in the negative electrode active material layer 106. The lithium ion and the electron are aggregated in this region and are occluded in the negative electrode active material layer 106. At the same time, in the positive electrode active material layer 101, an electron is released from the active material, and oxidation reaction of iron included in the active material is caused.

At the time of discharging, in the negative electrode 107, the negative electrode active material layer 106 releases lithium as an ion, and an electron is transferred to the second electrode 122. The lithium ion passes through the separator 110, reaches the positive electrode active material layer 101, and is taken in the active material in the positive electrode active material layer 101. At that time, the electron from the negative electrode 107 also reaches the positive electrode 102, and reduction reaction of iron is caused.

The lithium-ion secondary battery which is manufactured as described above includes the lithium phosphate compound having an olivine structure manufactured through a cleaning step as the positive electrode active material. Accordingly, in the lithium-ion secondary battery obtained in this embodiment, the discharging capacity can be large, and the charging and discharging rate can be high.

The lithium phosphate compound is highly purified to improve crystallinity, which makes it possible to increase the number of carrier ions which are intercalated and deintercalated in charging and discharging. Accordingly, in the lithium-ion secondary battery obtained in this embodiment, the discharging capacity can be large, and the charging and discharging rate can be high.

The methods, structures, and the like described in this embodiment can be combined as appropriate with any of the methods, structures, and the like described in the other embodiments.

Embodiment 4

In this embodiment, application of a power storage device according to one embodiment of the present invention will be described.

The power storage device can be provided in a variety of electronic devices. For example, the power storage device can be provided in cameras such as digital cameras or video cameras, mobile phones, portable information terminals, e-book readers, portable game machines, digital photo frames, audio reproducing devices, and the like. Moreover, the power storage device can be provided in electrically propelled vehicles such as electric vehicles, hybrid vehicles, electric railway cars, working vehicles, carts, wheel chairs, and bicycles.

The characteristics of a power storage device according to one embodiment of the present invention are improved; for example, higher capacitance and a higher charging and discharging rate are obtained. Improvement in the characteristics of the power storage device leads to reduction in size and weight of the power storage device. Provided with such a power storage device, electronic devices or electrically propelled vehicles can have a shorter charging time, a longer operating time, and reduced size and weight, and thus their convenience and design can be improved.

Figure 2A:
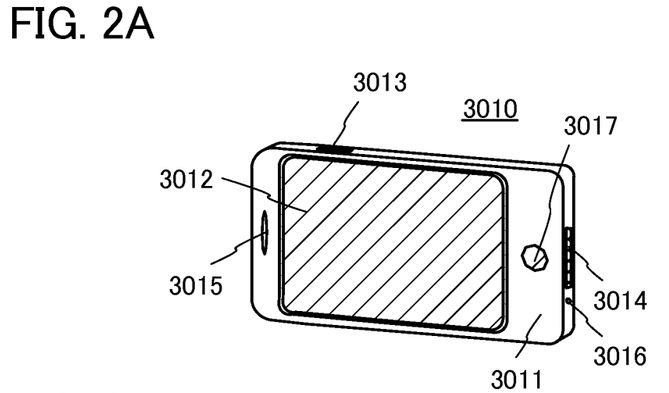
FIGS. 2A and 2B each illustrate an application example of a power storage device.

FIG. 2A illustrates an example of a mobile phone. In a mobile phone 3010, a display portion 3012 is incorporated in a housing 3011. The housing 3011 is provided with an operation button 3013, an operation button 3017, an external connection port 3014, a speaker 3015, a microphone 3016, and the like. When a power storage device according to one embodiment of the present invention is provided in such a mobile phone, the mobile phone can have improved convenience and design.

Figure 2B:
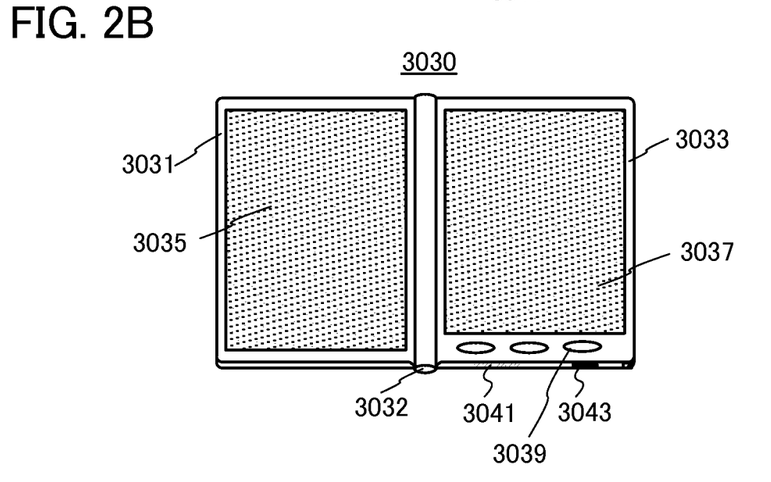

FIG. 2B illustrates an example of an e-book reader. An e-book reader 3030 includes two housings, a first housing 3031 and a second housing 3033, which are combined with each other with a hinge 3032. The first and second housings 3031 and 3033 can be opened and closed with the hinge 3032 as an axis. A first display portion 3035 and a second display portion 3037 are incorporated in the first housing 3031 and the second housing 3033, respectively. In addition, the second housing 3033 is provided with an operation button 3039, a power switch 3043, a speaker 3041, and the like. When a power storage device according to one embodiment of the present invention is provided in such an e-book reader, the e-book reader can have improved convenience and design.

Figure 3A:
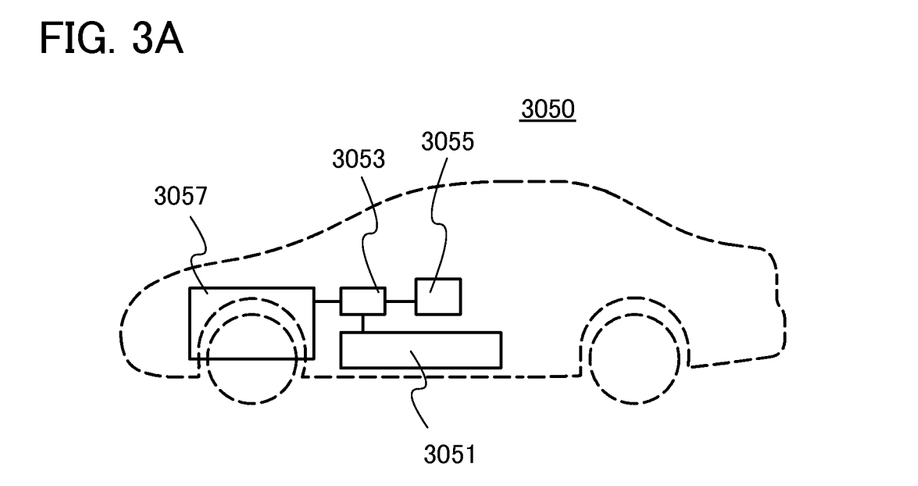
FIGS. 3A and 3B each illustrate an application example of a power storage device.

FIG. 3A illustrates an example of an electric vehicle. An electric vehicle 3050 is equipped with a power storage device 3051. The output of power of the power storage device 3051 is controlled by a control circuit 3053 and the power is supplied to a driving device 3057. The control circuit 3053 is controlled by a computer 3055.

The driving device 3057 includes a DC motor or an AC motor either alone or in combination with an internal-combustion engine. The computer 3055 outputs a control signal to the control circuit 3053 based on input data such as data of a driver's operation (e.g., acceleration, deceleration, or stop) of the electric vehicle 3050 or data in driving the electric vehicle 3050 (e.g., data of an upgrade or a downgrade or data of a load on a driving wheel). The control circuit 3053 adjusts electric energy supplied from the power storage device 3051 in accordance with the control signal of the computer 3055 to control the output of the driving device 3057. In the case where the AC motor is mounted on the driving device 3057, an inverter which converts direct current into alternate current is also incorporated.

The power storage device 3051 can be charged by external power supply using a plug-in technique. With the power storage device according to one embodiment of the present invention, which is equipped as the power storage device 3051, charging time can be shortened and convenience can be improved. Besides, the higher charging and discharging rate of the power storage device can contribute to greater acceleration and more excellent characteristics of the electric vehicle. When the power storage device 3051 itself can be formed to be compact and lightweight as a result of improved characteristics of the power storage device 3051, the vehicle can be lightweight and fuel efficiency can be increased.

Figure 3B:
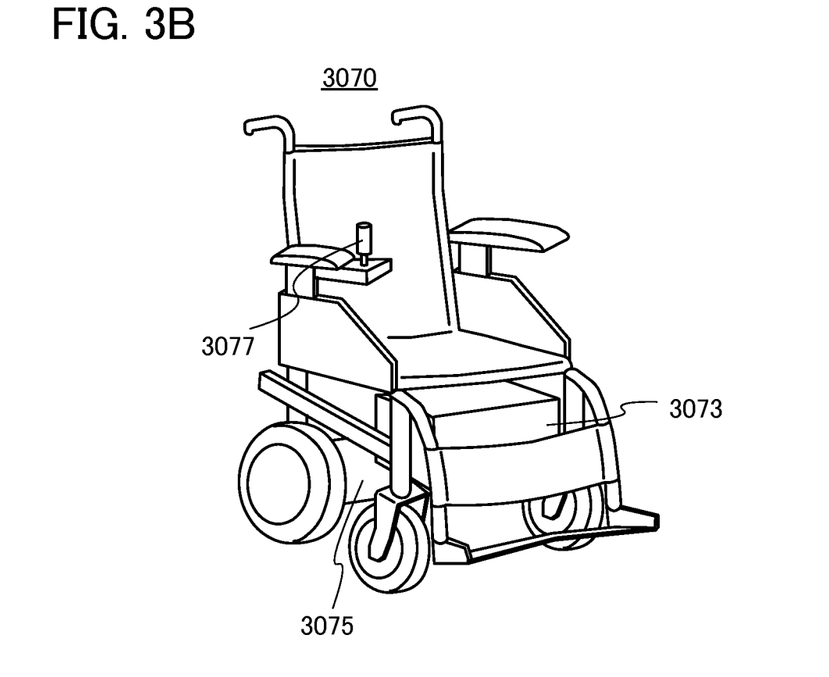

FIG. 3B illustrates an example of an electric wheelchair. A wheel chair 3070 includes a control portion 3073 which is provided with a power storage device, a power control portion, a control means, and the like. The power of the power storage device is controlled by the control portion 3073 to be output and is supplied to a driving portion 3075. Further, the control portion 3073 is connected to a controller 3077. By operation of the controller 3077, the driving portion 3075 can be driven via the control portion 3073 and movement of the wheel chair 3070 such as moving forward/backward and a turn and speed of the wheel chair 3070 can be controlled.

The power storage device of the wheel chair 3070 can also be charged by supplying power from the outside by a plug-in system. With the power storage device according to one embodiment of the present invention, which is equipped as the power storage device 3051, charging time can be shortened and convenience can be improved. Further, when the power storage device can be reduced in size and weight as a result of improvement in its characteristics, the user and the wheelchair helper can use the wheel chair 3070 more easily.

Note that in the case where a power storage device is provided in an electric railway car as an electrically propelled vehicle, the power storage device can be charged by supplying power from overhead lines or conductive rails.

The methods, structures, and the like described in this embodiment can be combined as appropriate with any of the methods, structures, and the like described in the other embodiments.

Example 1

In this example, description will be made on a result obtained by examining an effect of a cleaning step on battery characteristics of a power storage device in the case where lithium manganese phosphate is coated with a carbon material.

A method for manufacturing a power storage device used in this example will be described. In this example, a sample 1 formed through a cleaning step using a neutral cleaning solution, a sample 2 formed through a cleaning step using an alkaline cleaning solution, and a sample 3 formed without performing a cleaning step were used as samples.

Lithium carbonate ($Li_2CO_3$), manganese (II) carbonate ($MnCO_3$), and ammonium dihydrogen phosphate ($NH_4H_2PO_4$) as materials of lithium manganese phosphate were weighed so that Li:Mn:P is 1:1:1 in a molar ratio, and were ground with first ball mill treatment so as to be mixed. Note that lithium carbonate is a raw material for introducing lithium, manganese carbonate is a raw material for introducing manganese, and ammonium dihydrogen phosphate is a raw material for introducing phosphate. In the samples 1 to 3, as raw materials of the lithium manganese phosphate, lithium carbonate, manganese carbonate, and ammonium dihydrogen phosphate were used.

The first ball mill treatment was performed in such a manner that acetone was added as a solvent and a ball mill with a ball diameter of $\phi 3$ mm was rotated at 400 rpm for 2 hours. Note that a ball mill pot (cylindrical container) and a ball which are made of zirconia were used.

After the first ball mill treatment, a force of $1.47 \times 10^2$ N (150 kgf) was applied to the mixture of the raw materials to shape pellets.

Then, the pellets were subjected to first heat treatment (pre-baking). The first heat treatment was performed at 350° C. for 10 hours with the pellets placed in a nitrogen atmosphere.

After the first heat treatment, a baked product was ground in a mortar. The baked product which was ground was put in a conical flask and cleaned. The sample 1 (in the case where a cleaning solution is neutral) was cleaned in such a manner that 500 ml of pure water was poured in the conical flask and stirred at room temperature for an hour. The sample 2 (in the case where a cleaning solution is alkaline) was cleaned in such a manner that after 500 ml of pure water was mixed with NaOH and adjusted to yield a solution with a pH of 9.0, the solution was in the conical flask and stirred at room temperature for an hour. After the stirring, suction filtration was performed to collect a substance to be produced (a mixture).

Next, glucose was added to a cleaned mixture. The amount of glucose was 10 wt %.

The mixture to which glucose was added was subjected to second ball mill treatment. The second ball mill treatment was performed in such a manner that acetone was added as a solvent, and a ball mill with a ball diameter of $\phi 3$ mm was rotated at 400 rpm for 2 hours.

After the second ball mill treatment, a force of $1.47 \times 10^2$ N (150 kgf) was applied to the mixture to shape pellets.

Then, the pellets were subjected to second heat treatment (main baking). The second heat treatment was performed at 600° C. for 10 hours with the pellets placed in a nitrogen atmosphere. Through the above steps, lithium manganese phosphate having a surface coated with a carbon material was obtained as the baked product.

After the second heat treatment, the baked product was ground in a mortar.

The lithium manganese phosphate ($LiMnPO_4$) that is the baked product which was ground, acetylene black (AB) as a conduction auxiliary agent, and polytetrafluoroethylene (PTFE) as a binder were weighed so that the composition ratio of LiMnPO$_4$:acetylene black:PTFE in weight (wt %) was set to 80:15:5.

Then, the lithium manganese phosphate and the acetylene black were mixed in a mortar, and the polytetrafluoroethylene was added to the mixture and mixed to be dispersed.

The mixture was rolled four times by a roller press machine to obtain a sheet-like electrode layer with a thickness of 114 μm. Then, an aluminum meshed collector was pressure-bonded and punching was performed to obtain a round shape with ϕ12 mm, so that a positive electrode of a power storage device was obtained.

Lithium foil was used as a negative electrode and polypropylene (PP) was used as a separator. An electrolyte in which a solute was lithium hexafluorophosphate (LiPF$_6$) and a solvent was ethylene carbonate (EC) and dimethyl carbonate (DMC) was used. The separator and the positive electrode were impregnated with the electrolyte.

Through the above steps, a coin-type power storage device (the sample 1) including the positive electrode, the negative electrode, the separator, and the electrolyte was obtained. Assembly of the positive electrode, the negative electrode, the separator, the electrolyte, and the like was performed in a glove box in an argon atmosphere.

Next, a method for manufacturing a power storage device (the sample 3) used as a comparative example will be described.

The power storage device of the sample 3 was manufactured by a manufacturing method similar to those of the sample 1 and the sample 2 except that a cleaning step was not performed.

Results obtained by performing charge and discharge test on the samples 1 to 3 (with a charge/discharge tester, TOSCAT-3100 manufactured by TOYO SYSTEM CO., LTD.) will be described. The voltages for measurement were set in the range of 2.0 V to 4.8 V, and constant current constant voltage (CCCV) measurement was performed at the time of charging and constant current (CC) measurement was performed at the time of discharging. The rate of the constant current was 0.2 C and the cut-off current of the constant voltage had a value corresponding to 0.016 C. The quiescent time between charging and discharging was 2 hours.

Figure 4:
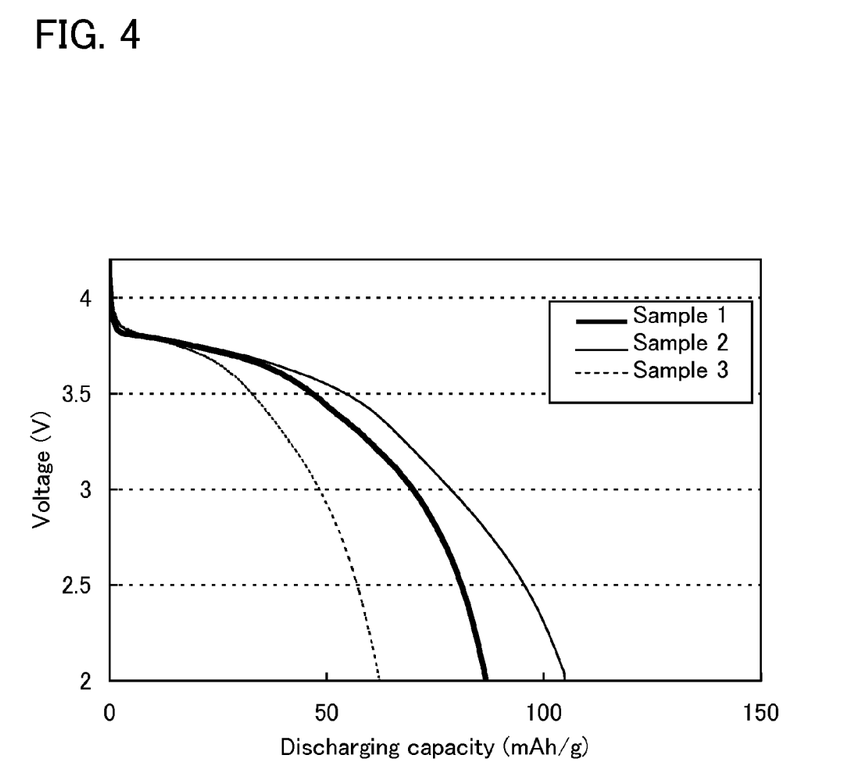
FIG. 4 shows the characteristics of a power storage device fabricated in Example.

FIG. 4 shows results of discharge characteristics of the power storage devices of the samples 1 to 3. In FIG. 4, the lateral axis indicates discharging capacity (mAh/g) and the longitudinal axis indicates voltage (V). The bold solid line indicates the discharge characteristics of the sample 1, the fine solid line indicates the discharge characteristics of the sample 2, and the dotted line indicates the discharge characteristics of the sample 3. As shown in FIG. 4, the discharge densities of the sample 1 and the sample 2 which were subjected to a cleaning step are higher than that of the sample 3 which was not subjected to a cleaning step.

The above results reveal that a cleaning step in a manufacturing process of a power storage device enabled an increase in discharging capacity of the power storage device. Therefore, by applying one embodiment of the present invention, a power storage device with a large discharging capacity can be manufactured.

Example 2

In this example, battery characteristics of a power storage device including lithium iron phosphate whose crystallinity is improved by reducing the impurity concentration as a positive electrode active material will be described.

A method for manufacturing a power storage device (a sample 4) used in this example will be described.

First, lithium carbonate (Li$_2$CO$_3$), iron (II) oxalate dihydrate (FeC$_2$O$_4$.2H$_2$O), and ammonium dihydrogen phosphate (NH$_4$H$_2$PO$_4$) as raw materials of lithium iron phosphate were weighed so that Li:Fe:P is 1:1:1 in a molar ratio, and were mixed with first ball mill treatment. Note that lithium carbonate is a raw material for introducing lithium, iron (II) oxalate dihydrate is a raw material for introducing iron, and ammonium dihydrogen phosphate is a raw material for introducing phosphate. In the sample 4, as raw materials of the lithium iron phosphate, lithium carbonate, iron (II) oxalate dehydrate, and ammonium dihydrogen phosphate whose impurity element concentrations were reduced were used.

The first ball mill treatment was performed in such a manner that acetone was added as a solvent and a ball mill with a ball diameter of ϕ3 mm was rotated at 400 rpm for 2 hours. Note that a ball mill pot (cylindrical container) and a ball which were made of zirconia were used.

After the first ball mill treatment, a force of $1.47 \times 10^2$ N (150 kgf) was applied to the mixture of the raw materials to shape pellets.

Then, the pellets were subjected to first heat treatment (pre-baking). The first heat treatment was performed at 350° C. for 10 hours with the pellets placed in a nitrogen atmosphere.

After the first heat treatment, the baked mixture was ground in a mortar. Then, the baked product which was ground was further ground with second ball mill treatment.

The second ball mill treatment was performed in such a manner that acetone was added as a solvent, and a ball mill with a ball diameter of ϕ3 mm was rotated at 400 rpm for 2 hours.

After the second ball mill treatment, a force of $1.47 \times 10^2$ N (150 kgf) was applied to the baked mixture which was ground to shape pellets.

Then, the pellets were subjected to second heat treatment (main baking). The second heat treatment was performed at 600° C. for 1 hour with the pellets placed in a nitrogen atmosphere. Through the above process, lithium iron phosphate was obtained as the baked product.

After the second heat treatment, the baked product was ground in a mortar.

Here, X-ray diffraction (XRD) measurement was performed on the baked product subjected to the second heat treatment. By X-ray diffraction, it was confirmed that the baked product was a single phase of LiFePO$_4$ of a space group Pnma (62).

Next, the obtained baked product (lithium iron phosphate (LiFePO$_4$)), a conduction auxiliary agent (acetylene black (AB)), and a binder (polytetrafluoroethylene (PTFE)) were weighed so that the composition ratio of LiFePO$_4$:AB:PTFE in weight (wt %) was set to 80:15:5.

Then, the lithium iron phosphate and the acetylene black were mixed in a mortar, and the polytetrafluoroethylene was added to the mixture and mixed to be dispersed.

The mixture was rolled four times by a roller press machine to obtain a sheet-like electrode layer with a thickness of 114 μm. Then, an aluminum meshed collector was pressure-bonded and punching was performed to obtain a round shape with ϕ12 mm, so that a positive electrode of a power storage device was obtained.

Lithium foil was used as a negative electrode and polypropylene (PP) was used as a separator. An electrolyte in which a solute was lithium hexafluorophosphate (LiPF$_6$) and a solvent was ethylene carbonate (EC) and dimethyl carbonate (DMC) was used. The separator and the positive electrode were impregnated with the electrolyte.

Through the above steps, a coin-type power storage device (the sample 4) including the positive electrode, the negative electrode, the separator, and the electrolyte was obtained. Assembly of the positive electrode, the negative electrode, the separator, the electrolyte, and the like was performed in a glove box in an argon atmosphere.

Next, a method for manufacturing a power storage device (a sample 5) used as a comparative example will be described.

In the sample 5, as raw materials of lithium iron phosphate, lithium carbonate, iron (II) oxalate dehydrate, and ammonium dihydrogen phosphate whose impurity element concentrations are each higher than that of the raw material of the sample 4 were used. The power storage device was manufactured by a manufacturing method similar to that of the sample 4, except for the raw materials of the lithium iron phosphate.

Table 1 shows the concentrations of impurity elements included in lithium carbonate (Li$_2$CO$_3$), iron (II) oxalate dihydrate (FeC$_2$O$_4$.2H$_2$O), and ammonium dihydrogen phosphate (NH$_4$H$_2$PO$_4$) which are used as raw materials of lithium iron phosphate (LiFePO$_4$), and lithium iron phosphate manufactured using these raw materials in the sample 4 and the sample 5. The concentrations shown in Table 1 were measured by glow discharge mass spectrometry. As a measurement apparatus, VG-9000 manufactured by V. G. Elemental Limited was used. Note that the values indicated as "certain values or less" mean that the values are the lower limits of detection or less and were not detected.

TABLE 1

| impurity element | | concentration (ppm) | | | |
|---|---|---|---|---|---|
| | | Li$_2$CO$_3$ | FeC$_2$O$_4$•2H$_2$O | NH$_4$H$_2$PO$_4$ | LiFePO$_4$ |
| S | sample 4 | 1 | 1.6 | 5 or less | 5.1 |
|   | sample 5 | 6.6 | 1100 | 5 or less | 300 |
| Mn | sample 4 | 0.02 | 0.1 or less | 0.1 or less | 0.55 |
|   | sample 5 | 0.08 | 300 | 1.2 | 150 |
| Fe | sample 4 | 0.03 | main | 0.46 | main |
|   | sample 5 | 0.43 | component | 0.67 | component |
| Ni | sample 4 | 0.05 | 0.1 or less | 0.1 or less | 0.1 or less |
|   | sample 5 | 0.02 | 110 | 0.15 | 71 |
| Si | sample 4 | 4.2 | 11 | 2.3 | 36 |
|   | sample 5 | 46 | 34 | 1.3 | 38 |
| Co | sample 4 | 0.005 or less | 0.1 or less | 0.05 or less | 0.1 or less |
|   | sample 5 | 0.02 | 53 | 0.05 or less | 37 |
| B | sample 4 | 0.01 or less | 0.25 | 1.3 | 1.7 |
|   | sample 5 | 0.01 or less | 4.2 | 16 | 9.5 |
| Zr | sample 4 | 0.05 or less | 0.05 or less | 0.05 or less | 15 |
|   | sample 5 | 0.05 or less | 0.11 | 0.05 or less | 8.3 |
| Mg | sample 4 | 0.26 | 0.1 or less | 0.4 | 0.8 |
|   | sample 5 | 0.17 | 11 | 0.13 | 4.5 |
| Ca | sample 4 | 17 | 3.8 | 0.5 or less | 1.8 |
|   | sample 5 | 4.2 | 30 | 0.5 or less | 4.2 |
| Cr | sample 4 | 0.51 | 0.1 or less | 0.5 or less | 0.38 |
|   | sample 5 | 0.46 | 17 | 0.5 or less | 4.1 |
| Al | sample 4 | 0.05 | 0.61 | 0.17 | 1 |
|   | sample 5 | 1.5 | 6.1 | 1.2 | 4 |
| Cl | sample 4 | 0.43 | 46 | 1.5 | 43 |
|   | sample 5 | 1.4 | 16 | 0.1 or less | 4 |
| Mo | sample 4 | 0.05 or less | 0.8 | 0.1 or less | 0.1 or less |
|   | sample 5 | 0.05 or less | 6.1 | 0.1 or less | 3.9 |
| Na | sample 4 | 0.51 | 0.84 | 2.3 | 3.6 |
|   | sample 5 | 1.9 | 3.2 | 0.65 | 3.4 |
| Zn | sample 4 | 0.17 | 0.1 or less | 0.5 or less | 0.59 |
|   | sample 5 | 0.56 | 4.6 | 0.5 or less | 2.6 |
| F | sample 4 | 0.05 or less | 0.5 or less | 5 or less | 8.9 |
|   | sample 5 | 4.6 | 0.5 or less | 5 or less | 2.4 |
| Cu | sample 4 | 0.05 or less | 0.1 or less | 5 or less | 0.1 or less |
|   | sample 5 | 0.05 or less | 1.1 | 5 or less | 1.8 |
| Ti | sample 4 | 0.005 or less | 0.57 | 0.12 | 1.7 |
|   | sample 5 | 0.04 | 0.61 | 0.91 | 0.89 |
| K | sample 4 | 1.5 | 0.57 | 50 or less | 0.17 |
|   | sample 5 | 0.65 | 50 or less | 50 or less | 0.48 |
| Nb | sample 4 | 0.01 or less | 0.1 or less | 0.5 or less | 0.1 or less |
|   | sample 5 | 0.01 or less | 0.1 or less | 0.5 or less | 0.2 |
| Y | sample 4 | 0.05 or less | 0.5 or less | 0.1 or less | 0.95 |
|   | sample 5 | 0.05 or less | 0.5 or less | 0.1 or less | 0.1 or less |
| total amount | sample 4 | 25.73 | 66.04 | 8.55 | 121.24 |
|   | sample 5 | 68.63 | 1697 | 22.21 | 650.27 |

As shown in Table 1, in lithium carbonate ($Li_2CO_3$) used as a raw material of the sample 4, the concentration of sulfur (S) is 1 ppm, the concentration of manganese (Mn) is 0.02 ppm, the concentration of nickel (Ni) is 0.05 ppm, the concentration of cobalt (Co) is 0.005 ppm or less (the lower limit of detection or less), the concentration of boron (B) is 0.01 ppm or less (the lower limit of detection or less), the concentration of chromium (Cr) is 0.51 ppm, the concentration of molybdenum (Mo) is 0.05 ppm or less (the lower limit of detection or less), and the concentration of zinc (Zn) is 0.17 ppm.

On the other hand, in lithium carbonate ($Li_2CO_3$) used as a raw material of the sample 5 manufactured as a comparative example, the concentration of sulfur (S) is 6.6 ppm, the concentration of manganese (Mn) is 0.08 ppm, the concentration of nickel (Ni) is 0.02 ppm, the concentration of cobalt (Co) is 0.02 ppm, the concentration of boron (B) is 0.01 ppm or less (the lower limit of detection or less), the concentration of chromium (Cr) is 0.46 ppm, the concentration of molybdenum (Mo) is 0.05 ppm or less (the lower limit of detection or less), and the concentration of zinc (Zn) is 0.56 ppm.

In iron (II) oxalate dihydrate ($FeC_2O_4.2H_2O$) used as a raw material of the sample 4, the concentration of sulfur (S) is 1.6 ppm, the concentration of manganese (Mn) is 0.1 ppm or less (the lower limit of detection or less), the concentration of nickel (Ni) is 0.1 ppm or less (the lower limit of detection or less), the concentration of cobalt (Co) is 0.1 ppm or less (the lower limit of detection or less), the concentration of boron (B) is 0.25 ppm, the concentration of chromium (Cr) is 0.1 ppm or less (the lower limit of detection or less), the concentration of molybdenum (Mo) is 0.8 ppm, and the concentration of zinc (Zn) is 0.1 ppm or less (the lower limit of detection or less).

On the other hand, in iron (II) oxalate dihydrate ($FeC_2O_4.2H_2O$) used as a raw material of the sample 5, the concentration of sulfur (S) is 1100 ppm, the concentration of manganese (Mn) is 300 ppm, the concentration of nickel (Ni) is 110 ppm, the concentration of cobalt (Co) is 53 ppm, the concentration of boron (B) is 4.2 ppm, the concentration of chromium (Cr) is 17 ppm, the concentration of molybdenum (Mo) is 6.1 ppm, and the concentration of zinc (Zn) is 4.6 ppm.

In ammonium dihydrogen phosphate ($NH_4H_2PO_4$) used as a raw material of the sample 4, the concentration of sulfur (S) is 5 ppm or less (the lower limit of detection or less), the concentration of manganese (Mn) is 0.1 ppm or less (the lower limit of detection or less), the concentration of nickel (Ni) is 0.1 ppm or less (the lower limit of detection or less), the concentration of cobalt (Co) is 0.05 ppm or less (the lower limit of detection or less), the concentration of boron (B) is 1.3 ppm, the concentration of chromium (Cr) is 0.5 ppm or less (the lower limit of detection or less), the concentration of molybdenum (Mo) is 0.1 ppm or less (the lower limit of detection or less), and the concentration of zinc (Zn) is 0.5 ppm or less (the lower limit of detection or less).

On the other hand, in ammonium dihydrogen phosphate ($NH_4H_2PO_4$) used as a raw material of the sample 5, the concentration of sulfur (S) is 5 ppm or less (the lower limit of detection or less), the concentration of manganese (Mn) is 1.2 ppm, the concentration of nickel (Ni) is 0.15 ppm, the concentration of cobalt (Co) is 0.05 ppm or less (the lower limit of detection or less), the concentration of boron (B) is 16 ppm, the concentration of chromium (Cr) is 0.5 ppm or less (the lower limit of detection or less), the concentration of molybdenum (Mo) is 0.1 ppm or less (the lower limit of detection or less), and the concentration of zinc (Zn) is 0.5 ppm or less (the lower limit of detection or less).

Table 1 shows that the impurity concentrations of lithium carbonate, iron (II) oxalate dihydrate ($FeC_2O_4.2H_2O$), and ammonium dihydrogen phosphate which were used as raw materials of the sample 4 are lower than the impurity concentrations of those used as raw materials of the sample 5. Particularly in the case of iron (II) oxalate dehydrate, the total concentration of the impurity elements shown in Table 1 is 1697 ppm in the sample 5, whereas the total concentration of the impurity elements shown in Table 1 is 66.04 ppm in the sample 4 which is significantly lower than that of the sample 5.

In the case of the sample 5, iron (II) oxalate dihydrate was found to include sulfur, which is an impurity element, at 1100 ppm. This concentration of sulfur accounts for approximately 65% of the impurity element concentration of the iron (II) oxalate dehydrate. Further, lithium iron phosphate manufactured using raw materials in which impurity element concentrations were not reduced was found to include sulfur at 300 ppm. This concentration of sulfur accounts for approximately 46% of the impurity element concentration of the lithium iron phosphate.

On the other hand, in the case of the sample 4, the concentration of sulfur included in iron (II) oxalate dihydrate was found to be as low as 1.6 ppm. Further, the concentration of sulfur included in lithium iron phosphate manufactured using raw materials in which impurity element concentrations was found to be as low as 5.1 ppm. Such facts reveal that reduction in concentration of sulfur included in iron (II) oxalate dihydrate considerably contributes to reduction in concentration of an impurity element in lithium iron phosphate.

In addition, in the case of the sample 5, iron (II) oxalate dihydrate was found to include manganese at 300 ppm. This concentration of manganese accounts for approximately 18% of the impurity element concentration of the iron (II) oxalate dehydrate. Further, lithium iron phosphate manufactured using raw materials in which impurity element concentrations were not reduced was found to include manganese at 150 ppm. This concentration of manganese accounts for approximately 23% of the impurity element concentration of the lithium iron phosphate.

On the other hand, in the case of the sample 4, the concentration of manganese included in iron (II) oxalate dihydrate was found to be as low as 0.1 ppm. Further, the concentration of manganese included in lithium iron phosphate manufactured using raw materials in which impurity element concentrations were reduced was found to be as low as 0.55 ppm. Such facts reveal that reduction in concentration of manganese included in iron (II) oxalate dihydrate considerably contributes to reduction in impurity element concentration in lithium iron phosphate.

Further, Table 1 shows that the impurity element concentration of lithium iron phosphate used as a positive electrode active material of the sample 4 is 122 ppm or less and is lower than the impurity element concentration of lithium iron phosphate used as a positive electrode active material of the sample 5, 650.27 ppm. Specifically, in the lithium iron phosphate used for the sample 4, the concentration of sulfur (S) is 5.1 ppm, the concentration of manganese (Mn) is 0.55 ppm, the concentration of nickel (Ni) is 0.1 ppm or less, the concentration of cobalt (Co) is 0.1 ppm or less, the concentration of boron (B) is 1.7 ppm, the concentration of chromium (Cr) is 0.38 ppm, the concentration of molybdenum (Mo) is 0.1 ppm or less, and the concentration of zinc (Zn) is 0.59 ppm. The total amount of the above elements is 8.62 ppm or less. Further, in the lithium iron phosphate used for the sample 5, the concentration of sulfur (S) is 300 ppm, the concentration of manganese (Mn) is 150 ppm, the concentration of nickel (Ni) is 71 ppm, the concentration of cobalt (Co) is 37 ppm, the concentration of boron (B) is 9.5 ppm, the concentration of chromium (Cr) is 4.1 ppm, the concentration of molybdenum (Mo) is 3.9 ppm, and the concentration of zinc (Zn) is 2.6 ppm. The total amount of the above elements is 578.1 ppm or less.

Table 2 shows results obtained by measuring the lattice constants of lithium iron phosphate used as positive electrode active materials of the samples 4 and 5 by X-ray diffraction. Note that Table 2 shows measurement results of the sample 4 in the case where the sample number n=1 is satisfied and the mean values of measurement results of the sample 5 in the case where the sample number n=9 is satisfied. In Table 2, database values are the values of lattice constants of lithium iron phosphate disclosed in the inorganic compound crystal structure database (ICSD).

TABLE 2

|  | a-axis $(1 \times 10^{-10}(m))$ | b-axis $(1 \times 10^{-10}(m))$ | c-axis $(1 \times 10^{-10}(m))$ |
|---|---|---|---|
| sample 4 | 10.3258 | 6.0052 | 4.6902 |
| sample 5 | 10.3338 | 6.0069 | 4.6977 |
| data base value | 10.3254 | 6.0035 | 4.6879 |

As shown in Table 2, the lattice constant in the a-axis direction of the lithium iron phosphate of the sample 4, in which the impurity element concentrations are reduced, is $10.3258 \times 10^{-10}$ m, the lattice constant in the b-axis direction is $6.0052 \times 10^{-10}$ m, and the lattice constant in the c-axis direction $4.6902 \times 10^{-10}$ m. The lattice constant in the a-axis direction of the lithium iron phosphate used in the sample 4 approximates the lattice constant in the a-axis direction of the database value, $10.3254 \times 10^{-10}$ m, the lattice constant in the b-axis direction approximates that of the database value, $6.0035 \times 10^{-10}$ m, and the lattice constant in the c-axis direction approximates that of the database value, $4.6879 \times 10^{-10}$ m, as compared to those of the sample 5.

It is considered that this is because crystal distortion occurred due to element substitution with another impurity element in the crystal structure of the lithium iron phosphate of the sample 5, in which impurity element concentrations were not reduced. In other words, the crystallinity of the lithium iron phosphate used for the sample 4 is better than that of the lithium iron phosphate used for the sample 5.

Next, results obtained by performing charge and discharge test on the sample 4 and the sample 5 (with a charge/discharge tester, TOSCAT-3100 manufactured by TOYO SYSTEM CO., LTD.) will be described. The voltages for measurement were set in the range of 2.0 V to 4.2 V, and constant current constant voltage (CCCV) measurement was performed at the time of charging and constant current (CC) measurement was performed at the time of discharging. The rate of the constant current was 0.2 C and the cut-off current of the constant voltage had a value corresponding to 0.016 C. The quiescent time between charging and discharging was 2 hours.

Figure 5:
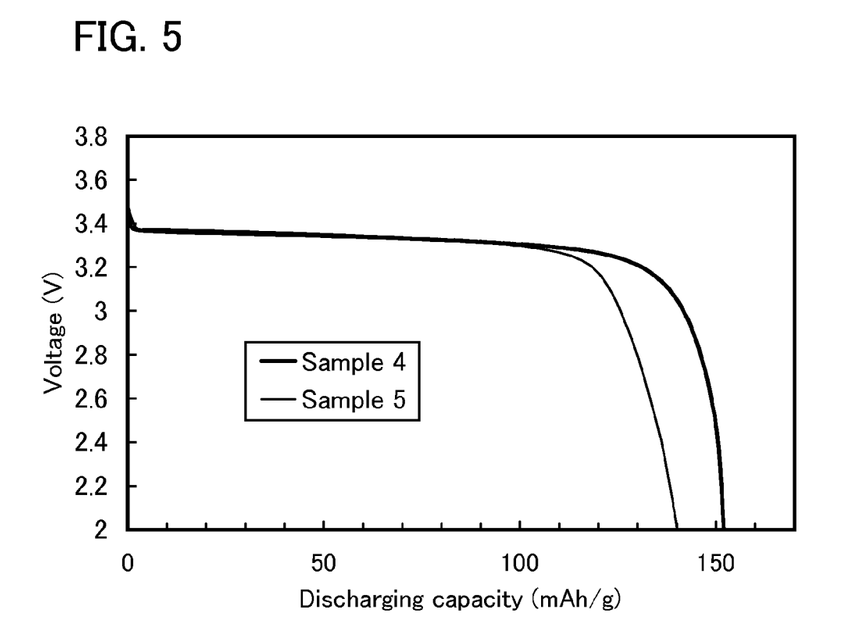
FIG. 5 shows the characteristics of a power storage device fabricated in Example.

FIG. 5 shows results of discharge characteristics of the power storage devices of the sample 4 and the sample 5. In FIG. 5, the lateral axis indicates discharging capacity (mAh/g) and the longitudinal axis indicates voltage (V). The bold solid line indicates the discharge characteristics of the sample 4, and the fine solid line indicates the discharge characteristics of the sample 5.

FIG. 5 reveals that the use of the lithium iron phosphate of the sample 4, which has improved crystallinity, for a power storage device can increase the discharging capacity of the power storage device.

From the above results, the following can be considered. The diffusion path of lithium in lithium iron phosphate which is a positive electrode active material is unidimensional. Thus, when the crystal structure of lithium iron phosphate has crystal distortion, the diffusion path of lithium is likely to have a harmful effect. As a cause of such crystal distortion, inferior crystallinity, a deficiency in a constituent element, or the like can be given. Further, in the crystal structure, element substitution with another impurity element or the like can be said to be a major factor of crystal distortion.

As described in this example, it is considered that crystal distortion occurred due to element substitution with another impurity element in the crystal structure of the lithium iron phosphate of the sample 5, in which impurity element concentrations were not reduced, and this resulted in a harmful effect on the diffusion path of lithium, and a smaller discharging capacity than the theoretical capacity.

On the other hand, in the crystal structure of the lithium iron phosphate in the sample 4, in which impurity element concentrations are reduced, it is considered that generation of crystal distortion was suppressed because element substitution with another impurity element was suppressed, and thus crystallinity was improved, and this resulted in favorable diffusion of lithium ions and a discharging capacity closer to the theoretical capacity.

The above indicates that improvement in crystallinity of lithium iron phosphate leads to improvement in battery characteristics of a power storage device.

Example 3

In this example, description will be made on a result obtained by examining an effect of the concentrations of impurity elements included in raw materials of lithium iron phosphate on battery characteristics of a power storage device in the case where the lithium iron phosphate is coated with a carbon material.

A method for manufacturing a power storage device (a sample 6) used in this example will be described.

As materials of lithium iron phosphate, lithium carbonate ($Li_2CO_3$), iron (II) oxalate dihydrate ($FeC_2O_4 \cdot 2H_2O$), and ammonium dihydrogen phosphate ($NH_4H_2PO_4$) were mixed with first ball mill treatment. As the above raw materials, those in which impurity elements were reduced were used.

The first ball mill treatment was performed in such a manner that acetone was added as a solvent and a ball mill with a ball diameter of $\phi 3$ mm was rotated at 400 rpm for 2 hours. Note that a ball mill pot (cylindrical container) and a ball which are made of zirconia were used.

After the first ball mill treatment, a force of $1.47 \times 10^2$ N (150 kgf) was applied to the mixture of the raw materials to shape pellets.

Then, the pellets were subjected to first heat treatment (pre-baking). The first heat treatment was performed at 350° C. for 10 hours with the pellets placed in a nitrogen atmosphere.

After the first heat treatment, a baked product was ground in a mortar.

Next, glucose was added to the baked product which was ground. The amount of glucose was 10 wt %.

The mixture to which glucose was added was subjected to second ball mill treatment. The second ball mill treatment was performed in such a manner that acetone was added as a solvent, and a ball mill with a ball diameter of $\phi 3$ mm was rotated at 400 rpm for 2 hours.

After the second ball mill treatment, a force of $1.47 \times 10^2$ N (150 kgf) was applied to the mixture to shape pellets.

Then, the pellets were subjected to second heat treatment (main baking). The second heat treatment was performed at 600° C. for 10 hours with the pellets placed in a nitrogen atmosphere. Through the above steps, lithium iron phosphate having a surface coated with a carbon material was obtained as the baked mixture.

After the second heat treatment, the baked mixture was ground in a mortar.

Next, the obtained baked product (lithium iron phosphate ($LiFePO_4$)), a conduction auxiliary agent (acetylene black (AB)), and a binder (polytetrafluoroethylene (PTFE)) were weighed so that the composition ratio of $LiFePO_4$:AB:PTFE in weight (wt %) was set to 80:15:5.

Then, the lithium iron phosphate and the acetylene black were mixed in a mortar, and the polytetrafluoroethylene was added to the mixture and mixed to be dispersed.

The mixture was rolled four times by a roller press machine to obtain a sheet-like electrode layer with a thickness of 114 μm. Then, an aluminum meshed collector was pressure-bonded and punching was performed to obtain a round shape with φ12 mm, so that a positive electrode of a power storage device was obtained.

Lithium foil was used as a negative electrode and polypropylene (PP) was used as a separator. An electrolyte in which a solute was lithium hexafluorophosphate ($LiPF_6$) and a solvent was ethylene carbonate (EC) and dimethyl carbonate (DMC) was used. The separator and the positive electrode were impregnated with the electrolyte.

Through the above steps, a coin-type power storage device (the sample 6) including the positive electrode, the negative electrode, the separator, and the electrolyte was obtained. Assembly of the positive electrode, the negative electrode, the separator, the electrolyte, and the like was performed in a glove box in an argon atmosphere.

Next, a method for manufacturing a power storage device (a sample 7) used as a comparative example will be described.

The power storage device of the sample 7 is manufactured by a manufacturing method similar to that of the sample 6 except that as raw materials of lithium iron phosphate, lithium carbonate, iron (II) oxalate dihydrate, and ammonium dihydrogen phosphate whose impurity element concentrations were reduced were used.

The impurity element concentrations of lithium iron phosphate which is positive electrode active materials of the samples 6 and 7 are the same as those of the sample 4 and the sample 5, which are shown in Table 1 of Example 2.

Next, results obtained by performing charge and discharge test on the samples 6 and 7 (with a charge/discharge tester, TOSCAT-3100 manufactured by TOYO SYSTEM CO., LTD.) will be described. The voltages for measurement were set in the range of 2.0 V to 4.2 V, and constant current constant voltage (CCCV) measurement was performed at the time of charging and constant current (CC) measurement was performed at the time of discharging. The rate of the constant current was 0.2 C and the cut-off current of the constant voltage had a value corresponding to 0.016 C. The quiescent time between charging and discharging was 2 hours.

Figure 6:
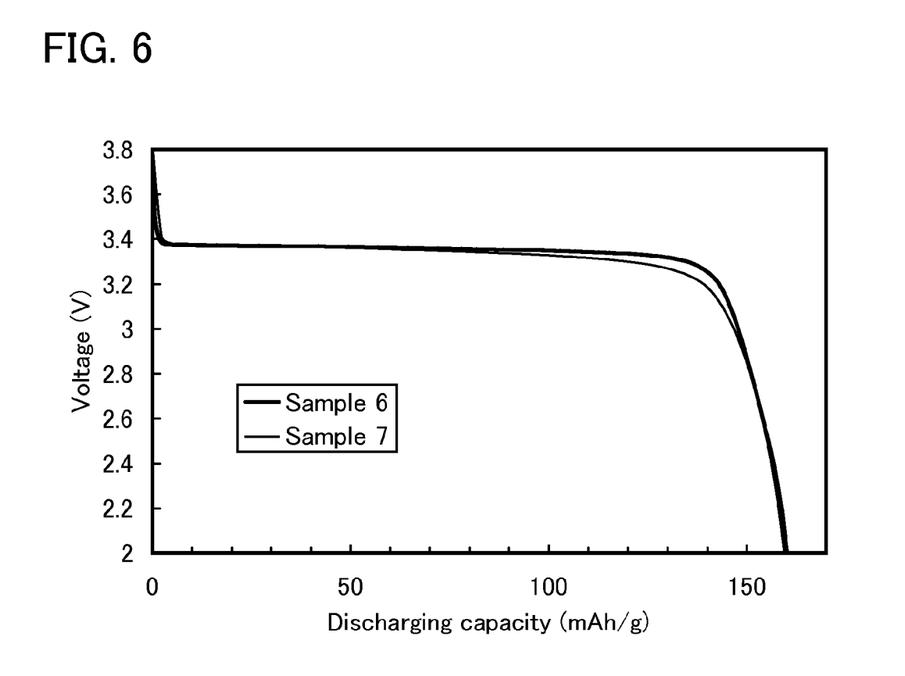
FIG. 6 shows the characteristics of a power storage device fabricated in Example.

FIG. 6 shows results of discharge characteristics of the power storage devices of the samples 6 and 7. In FIG. 6, the lateral axis indicates discharging capacity (mAh/g) and the longitudinal axis indicates voltage (V). The bold solid line indicates the discharge characteristics of the sample 6, and the fine solid line indicates the discharge characteristics of the sample 7.

FIG. 6 reveals that reduction in impurity element concentrations of raw materials enables an increase in energy density.

This application is based on Japanese Patent Application serial no. 2010-228857 filed with the Japan Patent Office on Oct. 8, 2010 and Japanese Patent Application serial no. 2010-228849 filed with the Japan Patent Office on Oct. 8, 2010, the entire contents of which are hereby incorporated by reference.

What is claimed is:

1. A method for manufacturing a power storage device, comprising:
    performing first heat treatment on a mixture of a first compound including lithium and sulfur which is a first impurity element, a second compound including phosphorus and sulfur which is a second impurity element, and a third compound including a metal element and sulfur which is a third impurity element such that the metal element is selected from manganese, iron, cobalt, and nickel;
    performing a cleaning step on the mixture after the first heat treatment by using an alkaline cleaning solution;
    performing second heat treatment on the mixture to produce a lithium phosphate compound after the cleaning step; and
    forming an electrode including the lithium phosphate compound,
    wherein a concentration of the first impurity element contained in the first compound is 1 ppm or less,
    wherein a concentration of the second impurity element contained in the second compound is 5 ppm or less, and
    wherein a concentration of the third impurity element contained in the third compound is 1.6 ppm or less.

2. The method for manufacturing a power storage device, according to claim 1,
    wherein a temperature of the second heat treatment is higher than a temperature of the first heat treatment.

3. The method for manufacturing a power storage device, according to claim 1,
    wherein the first heat treatment is performed at a temperature of greater than or equal to 300° C. and less than or equal to 400° C., and
    wherein the second heat treatment is performed at a temperature of greater than or equal to 500° C. and less than or equal to 800° C.

4. The method for manufacturing a power storage device, according to claim 1, wherein the second compound is ammonium dihydrogen phosphate.

5. The method for manufacturing a power storage device, according to claim 1,
    wherein the first compound is lithium carbonate, and
    wherein the third compound is iron (II) oxalate dehydrate.

6. The method for manufacturing a power storage device, according to claim 1,
    wherein the first compound contains boron as an impurity element,
    wherein a concentration of boron contained in the first compound is 0.01 ppm or less,
    wherein the second compound contains boron as an impurity element,
    wherein a concentration of boron contained in the second compound is 1.3 ppm or less,
    wherein the third compound contains boron as an impurity element, and
    wherein a concentration of boron contained in the third compound is 0.25 ppm or less.

7. The method for manufacturing a power storage device, according to claim 1,
    wherein the first compound contains chromium as an impurity element, wherein a concentration of chromium contained in the first compound is 0.51 ppm or less,
wherein the second compound contains chromium as an impurity element,
wherein a concentration of chromium contained in the second compound is 0.5 ppm or less,
wherein the third compound contains chromium as an impurity element, and
wherein a concentration of chromium contained in the third compound is 0.1 ppm or less.

8. The method for manufacturing a power storage device, according to claim 1, wherein the first heat treatment is performed in a hydrogen atmosphere.

9. The method for manufacturing a power storage device, according to claim 1, wherein the cleaning step is performed for one hour.

10. The method for manufacturing a power storage device, according to claim 1, wherein the alkaline cleaning solution is a sodium hydroxide solution with a pH of 9.0.

11. A method for manufacturing a power storage device, comprising:
   performing first heat treatment on a mixture of a first compound including lithium and sulfur which is a first impurity element, a second compound including phosphorus and sulfur which is a second impurity element, and a third compound including a metal element and sulfur which is a third impurity element such that the metal element is selected from manganese, iron, cobalt, and nickel;
   performing a cleaning step on the mixture after the first heat treatment by using an alkaline cleaning solution;
   adding an organic compound to the mixture after the cleaning step;
   performing second heat treatment on the mixture to produce a lithium phosphate compound after adding the organic compound; and
   forming an electrode including the lithium phosphate compound,
   wherein a concentration of the first impurity element contained in the first compound is 1 ppm or less,
   wherein a concentration of the second impurity element contained in the second compound is 5 ppm or less, and
   wherein a concentration of the third impurity element contained in the third compound is 1.6 ppm or less.

12. The method for manufacturing a power storage device, according to claim 11,
   wherein a temperature of the second heat treatment is higher than a temperature of the first heat treatment.

13. The method for manufacturing a power storage device, according to claim 11,
   wherein the first heat treatment is performed at a temperature of greater than or equal to 300° C. and less than or equal to 400° C., and
   wherein the second heat treatment is performed at a temperature of greater than or equal to 500° C. and less than or equal to 800° C.

14. The method for manufacturing a power storage device, according to claim 11, wherein the second compound is ammonium dihydrogen phosphate.

15. The method for manufacturing a power storage device, according to claim 11,
   wherein the first compound is lithium carbonate, and
   wherein the third compound is iron (II) oxalate dehydrate.

16. The method for manufacturing a power storage device, according to claim 11, wherein the organic compound is glucose.

17. The method for manufacturing a power storage device, according to claim 11,
   wherein the first compound contains boron as an impurity element,
   wherein a concentration of boron contained in the first compound is 0.01 ppm or less,
   wherein the second compound contains boron as an impurity element,
   wherein a concentration of boron contained in the second compound is 1.3 ppm or less,
   wherein the third compound contains boron as an impurity element, and
   wherein a concentration of boron contained in the third compound is 0.25 ppm or less.

18. The method for manufacturing a power storage device, according to claim 11,
   wherein the first compound contains chromium as an impurity element,
   wherein a concentration of chromium contained in the first compound is 0.51 ppm or less,
   wherein the second compound contains chromium as an impurity element,
   wherein a concentration of chromium contained in the second compound is 0.5 ppm or less,
   wherein the third compound contains chromium as an impurity element, and
   wherein a concentration of chromium contained in the third compound is 0.1 ppm or less.

19. The method for manufacturing a power storage device, according to claim 11, wherein the first heat treatment is performed in a hydrogen atmosphere.

20. The method for manufacturing a power storage device, according to claim 11, wherein the cleaning step is performed for one hour.

21. The method for manufacturing a power storage device, according to claim 11, wherein the alkaline cleaning solution is a sodium hydroxide solution with a pH of 9.0.

* * * * *